United States Patent [19]

Cushman

[11] 4,371,921
[45] * Feb. 1, 1983

[54] INERTIAL INSTRUMENT WITH A TEMPORALLY DIGITIZED REBALANCE NETWORK

[75] Inventor: Glenn F. Cushman, Norfolk, Mass.

[73] Assignee: Northrop Corporation, Los Angeles, Calif.

[*] Notice: The portion of the term of this patent subsequent to Apr. 29, 1997, has been disclaimed.

[21] Appl. No.: 144,256

[22] Filed: Apr. 28, 1980

Related U.S. Application Data

[63] Continuation-in-part of Ser. No. 922,818, Jul. 10, 1978, Pat. No. 4,200,925.

[51] Int. Cl.[3] ............................................. G06F 15/50
[52] U.S. Cl. .................................. 364/138; 318/562; 318/636; 364/174; 364/453
[58] Field of Search ............... 364/107, 111, 118, 434, 364/453, 454, 138, 174; 318/562, 636

[56] References Cited

U.S. PATENT DOCUMENTS

| | | | |
|---|---|---|---|
| 3,284,617 | 11/1966 | Lerman | 364/453 |
| 3,417,235 | 12/1968 | Clark et al. | 318/562 |
| 3,465,332 | 9/1969 | Neal et al. | 318/562 X |
| 3,582,621 | 6/1971 | Lawler | 318/636 X |
| 3,694,631 | 9/1972 | Cushman | 364/453 X |
| 3,777,128 | 12/1973 | Kirkham | 318/636 X |
| 3,872,284 | 3/1975 | Seligman et al. | 364/453 |
| 3,944,903 | 3/1976 | Clegg | 318/562 X |
| 3,987,282 | 10/1976 | Lau et al. | 364/118 |
| 4,038,590 | 7/1977 | Knowlton | 381/562 |

*Primary Examiner*—Jerry Smith
*Attorney, Agent, or Firm*—Kenway & Jenney

[57] ABSTRACT

An inertial instrument has a temporally digitized rebalance network and at least one associated inertial sensor, position signal generator, and torquer. The rebalance network features a digital torque correction network, a digital pulse width modulation circuitry for generating a pulse width modulated rebalance torquer signal, the pulse width being one of a plurality of discrete values, and circuitry for applying those signals to the torquer. A digital output, representing the rebalance signal, can also be made available for further processing.

5 Claims, 6 Drawing Figures

INERTIAL INSTRUMENT WITH A TEMPORALLY DIGITIZED REBALANCE NETWORK

BACKGROUND OF THE INVENTION

This is a continuation-in-part of my application Ser. No. 922,818 filed July 10, 1978 and now U.S. Pat. No. 200,925 for an Inertial Instrument with a Multiplexed Rebalance Network.

This invention relates generally to inertial instrumentation, and more particularly to digital rebalance control networks for inertial sensor instruments.

In conventional inertial instruments, individual inertial sensors may be single degree of freedom (SDF) gyros, dynamically tuned (two degree of freedom) gyros, or accelerometers, or other known sensors. A typical multiple sensor instrument is an attitude reference assembly for a missile guidance system, which includes six single degree of freedom inertial sensors (three gyros and three accelerometers). Each inertial sensor is embodied in a torque-to-balance loop. In addition to the inertial sensor, the loop includes (1) a signal generator (such as a microsyn) for producing a signal representative of the sensor position, (2) a rebalance loop compensation network for modifying the signal generator output signal in accordance with desired performance characteristics, and (3) a torquer which is responsive to the modified signal generator output signal to rebalance the inertial sensor.

Typically, each inertial sensor in the instrument and its associated rebalance network includes all of the above-noted elements to form a full rebalance network. These elements, in order to operate at maximum precision, are dependent upon the precision of the signals which are provided by the signal generator and which are provided to the torquer. In order to provide accurate signals to the torquer, in those instances where the amplitude of the signal changes, substantially expensive and sophisticated electronics must be provided.

Accordingly, it is an object of this invention to provide signals to the torquer which are accurate, precise, and which can be generated with relatively "simple", inexpensive, and yet reliable digital circuitry.

SUMMARY OF THE INVENTION

The invention relates generally to a digital rebalance loop inertial instrument having an inertial sensor for each rebalance loop. In some embodiments only one rebalance loop is present. Each sensor has associated with it an element for generating a position signal and a torquer element for applying torque to the sensor in response to an applied torquer signal. The rebalance loop features a rebalance network applied to each inertial sensor and the network features a digital torque correction circuit for generating a digital correction signal for each sensor. The digital correction signal has a succession of digital correction words, each digital correction word in the succession being representative of the value of a torque signal to be applied to one of the sensor torquer elements. The network further features a digital pulse width modulation circuit responsive to the succession of digital correction words for generating a corresponding succession of pulse width modulated, constant amplitude, digitally controlled, discretely timed torquer signals. The network further has circuitry for applying the torquer signals to each of the respective sensor torquer elements.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF PREFERRED PARTICULAR EMBODIMENTS

Figure 1:
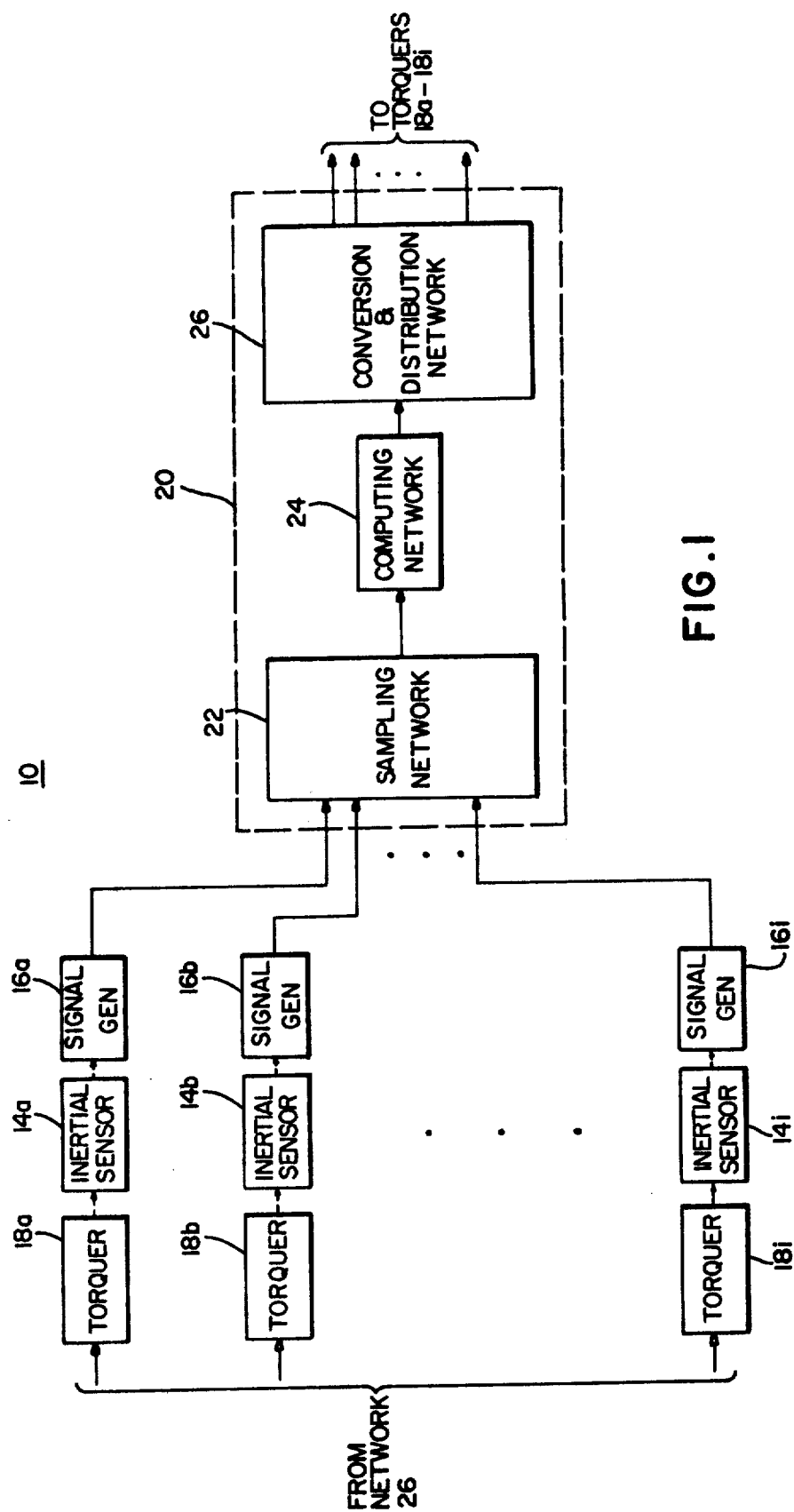
FIG. 1 shows, in block diagram form, a first exemplary embodiment of the present invention.

Referring to FIG. 1, a typical inertial instrument 10 includes a plurality of inertial sensors 14a, 14b, . . . 14i, with each inertial sensor having an associated one of signal generators 16a, 16b, . . . 16i, and torquers 18a, 18b, . . . 18i. The broken-line arrows between the torquers and sensors, and between the signal generators and sensors, represent the coupling between those elements.

Each of the inertial sensors may be conventional in form, for example, a type GI-G6 single degree of freedom gyro and associated microsyn signal generator and permanent magnet torquer, manufactured by Northrop Corporation, Norwood, Mass. In alternative systems, one or more of the inertial sensors may be a Northrop type APG-6 accelerometer (which is similar to the GI-G6 gyro except that the gyro wheel is replaced with a pendulous mass element) and associated signal generator and torquer.

In operation, according to this first illustrated embodiment of the invention, a sampling network 22 successively samples the position signals provided by the signal generators of sensors 14a-14i. Network 22 produces a succession of digital position words representative of the succession of sampled values from the position signals. A computing network 24 successively transforms each of the digital position words into a digital rebalance word for the corresponding inertial sensor. A conversion and distribution network 26 converts each of the digital rebalance words to a torquer signal and then applies that torquer signal to the respective torquer.

Figure 2:
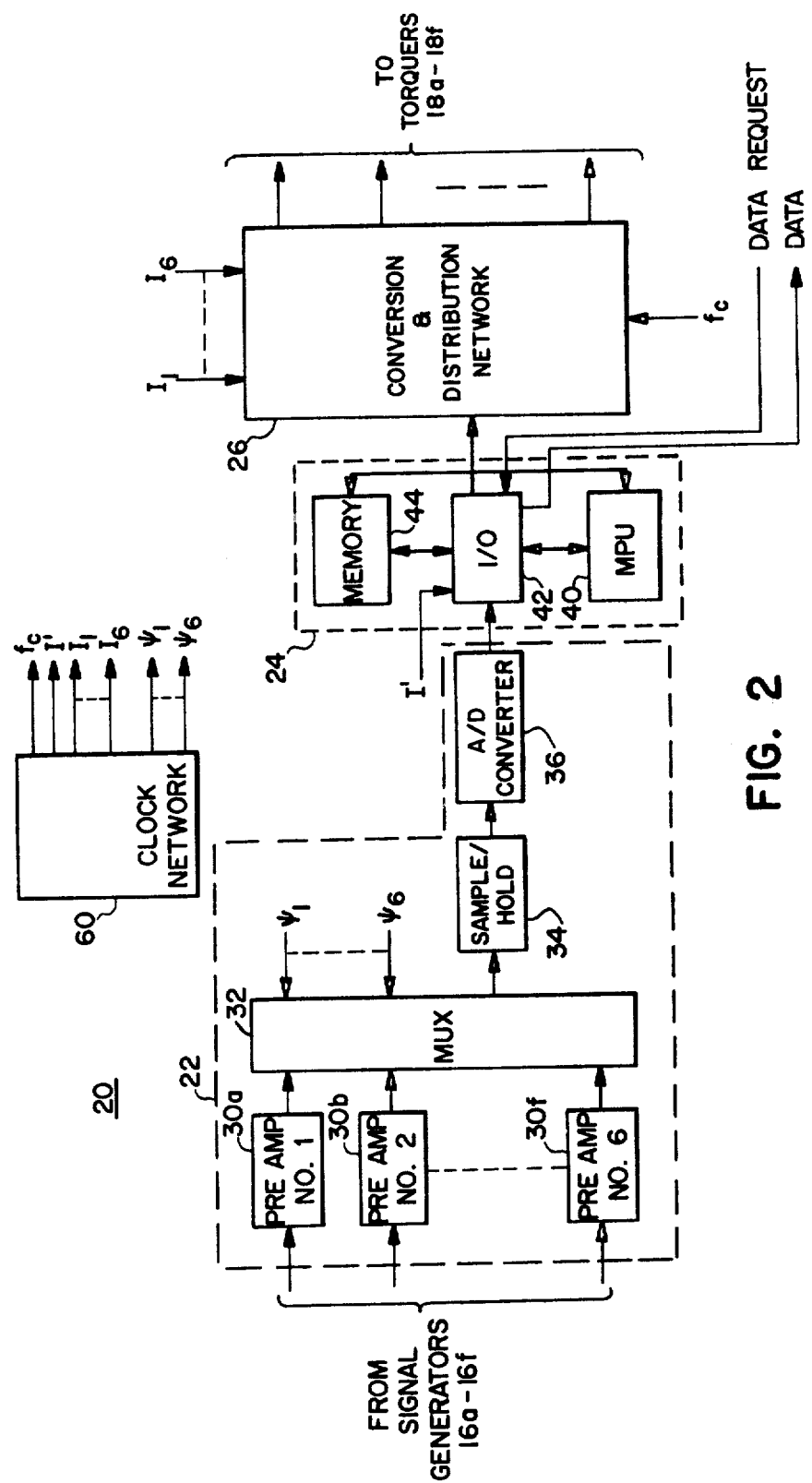
FIG. 2 shows, in block diagram form, an exemplary multiplexed rebalance network for the system of FIG. 1.

FIG. 2 shows an embodiment of a multiplexed rebalance network suitable for use with the six-rebalance loop embodiment of FIG. 1. This exemplary system is representative of one that might be used in a strap-down inertial instrument for a missile and includes six single degree of freedom inertial sensors: three gyros (corresponding to sensors 14a-14c) and three accelerometers (corresponding to sensors 14d-14f). In FIG. 2, elements corresponding to similar elements in FIG. 1 are identified with identical reference designations.

As shown in FIG. 2, network 20 has six input channels, each coupled to the signal generator of one of inertial sensors 14a-14f. The sampling network 22 includes preamplifiers 30a-30f, associated with a respective one of the input channels, a multiplexer 32, a sample-and-hold network 34, and an analog-to-digital (A/D) converter 36. The computing network 24 includes a microprocessing unit (MPU) 40, an input/output network 42 and a memory 44.

Figure 3:
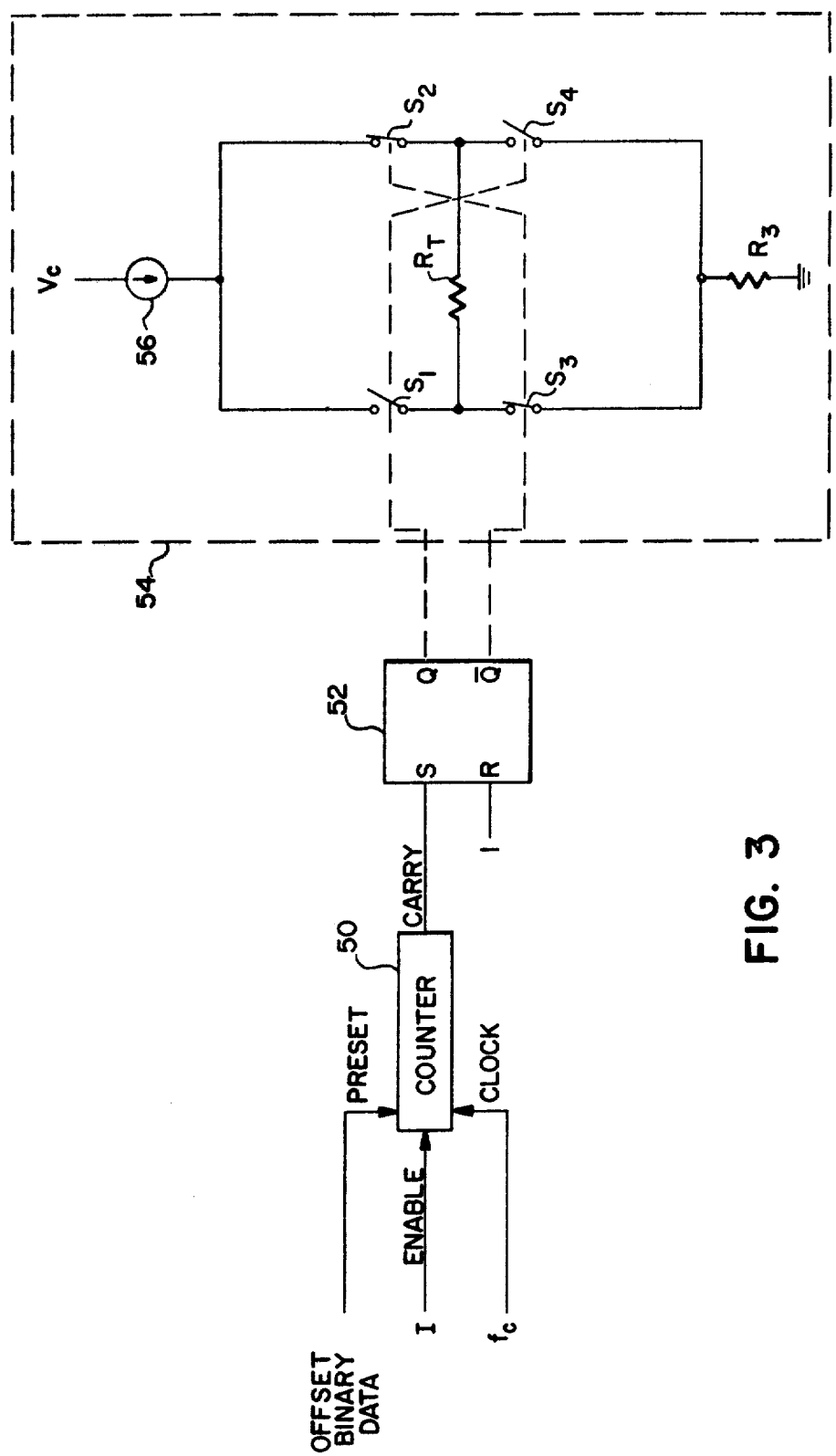
FIG. 3 shows, partially in schematic and partially in block diagram form, a portion of an exemplary conversion network of the system of FIG. 1.

The conversion portion of network 26 for one of the six channels of the present embodiment is shown in FIG. 3. This portion includes a synchronous counter 50, a set-reset flip-flop 52, and an "H" bridge 54. Bridge 54 includes ganged switches S1 and S4 coupled to the Q output of flip-flop 52, ganged switches S2 and S3 coupled to the $\overline{Q}$ output of the flip-flop 52, and a current source 56. The torquer for the associated channel is represented by resistor $R_T$.

Figure 4:
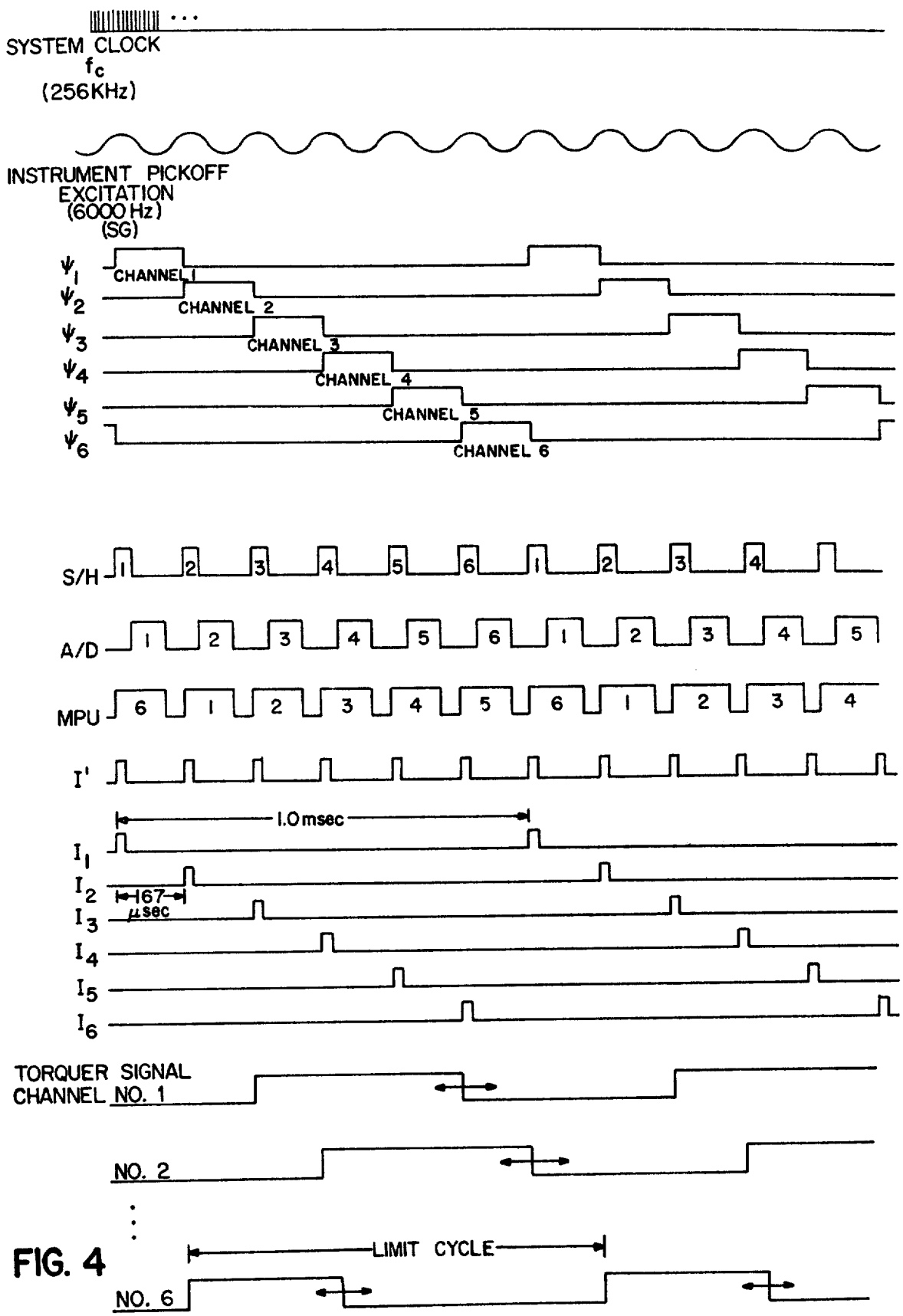
FIG. 4 shows waveforms illustrating the operation of the system of FIGS. 1-3.

A clock network 60 provides various timing signals for the rebalance network 20, including the 256 MHz system clock ($f_c$), as illustrated in FIG. 4, together with other systems of waveforms.

The operation of this first illustrated embodiment will now be described in detail using the diagrams of FIGS. 1-3 and the waveforms shown in FIG. 4. In operation, the microsyn signal generator of each inertial sensor produces an instrument pickoff excitation signal at 6000 Hz (representative of the sensor position), represented for one channel at the line denoted SG of FIG. 4. The excitation signals are amplified by the respective channel preamplifiers. The output signals from the preamplifiers are sequentially sampled by multiplexer 32 in response to the multiplexing clock signals $\psi_1$-$\psi_6$ shown in FIG. 4.

The multiplexed signal produced by multiplexer 32 is then sampled and held by network 34 during the respective channel periods denoted by the reference numerals in the S/H waveform of FIG. 4. After the sampling operation is complete, A/D converter 36 is operative to convert the resulting DC signal to a parallel digital word for the respective samples during the periods denoted by the respective numerals in the A/D waveform of FIG. 4. This digital signal is then made available to the I/O section 42 of computing network 24.

The clock network 60 also produces an interrupt signal I' and pulse signals $I_1$-$I_6$ at the basic channel sampling rate as shown in FIG. 4.

In response to each pulse in the interrupt signal, MPU 40 is operative for a channel during the respective period indicated by MPU waveform of FIG. 4 to interrupt its operation, read the current digital word from the A/D converter 36, and then using that word as an input to a loop compensation subroutine, compute a digital rebalance word for the respective loop. The loop compensation can have many variations depending on specific applications. In the present embodiment, for example, the compensation for channel 1 has the following form.

$$H(S) = \frac{K_1(T_1S + 1)}{S}$$

In this embodiment, $K_1$ and $T_1$ are selected to be powers of two, so that the multiplication and division may be performed by register shifting operations. With a Motorola type 6800 microprocessor, such operations are accomplished within 100 microseconds. The program for MPU 40 is shown in the Appendix. In alternative embodiments, the MPU 40 may readily be programmed to generate the digital rebalance word by first using the loop compensation function and then by modifying this result by appropriate functions for scale factor corrections and bias corrections. These functions are well known for conventional inertial sensor assemblies.

In the present embodiment, the torquer rebalance digital rebalance word is initially provided in 2's comlementary binary form, and then is converted to offset binary by complementing the most significant bit. At the conclusion of this routine, the digital rebalance word is present in offset binary form at the output of the microprocessor.

In the present embodiment, a continuous drive, pulse width modulated binary signal is used to drive the permanent magnet torquers of the inertial sensors and the modulated binary signal is generated as follows. Upon receipt of the various pulses from the $I_1$-$I_6$ signals, the offset binary words are diverted to the appropriate channel conversion portion of network 26. For the exemplary portion of network 26 shown in FIG. 3, the offset word is used to preset an 8-bit synchronous counter 50. At the termination of the I pulse for the channel, the counter 50 starts counting at the clock rate $f_c$. Depending on the preset value, the counter overflows at a unique time during the next one millisecond. The resultant overflow pulse is then used to set the flip-flop 52 which controls the ganged semi-conductor switches S1-S4 in the H bridge 54. At the time that the switches change position, the current flow direction (but not the amplitude) in the torquer winding is reversed. Thus, a continuous drive, quantized (one part in 256 for this system) pulse width modulation signal is generated from the 8-bit 2's complement parallel output signal. Exemplary torquing signals for channels 1-6 are illustrated in FIG. 4.

Accordingly, with the present embodiment, the technique of sequentially processing sensor data during specified time blocks by the multiplexing of six channels at a relatively high sampling rate is implemented with low cost commercially available microprocessor and associated circuit elements. In this embodiment, a sampling rate of 1,000 times a second per channel is more than adequate to satisfy the 50-100 Hz loop bandwidth requirements of the typical tactical system applications. To read torquing data out of the microprocessing based system, the MPU need only compute the net torque required per limit cycle and accumulate this data in an erasable memory (RAM) for each channel. Through an interrupt routine, another computer can, for example, on a periodic basis, retrieve this data.

Also, since the loop compensation is handled on an interrupt basis by a microprocessor, as is the data readout, it is possible to use the microprocessor down time to perform other data conversion and system functions. Typical operations that could be performed by the MPU are: (1) correction of instrument data for scale factor, bias and misalignment, (2) correction of sensor data for mass unbalance, (3) systems self-test and fault monitoring, and (4) correction of data for sensitivity to variations of other forcing functions, such as temperature and voltage. With respect to the self-test function, the microprocessor may be programmed to periodically "open" a rebalance loop, insert a test rebalance word, and measure the resultant rebalance word provided by the normal compensation function. In this manner the system response may be measured on a self-test mode.

Further, advantageously, the apparatus need only provide a single current amplitude, provided by current source 56, and the quantization of the signal is provided by the digital timing electronics. The quantization is as accurate as the offset signal provided to the 8 bit synchronous counter 50. Thus, for each full pulse cycle represented by a high followed by a low signal (torquer signals, FIG. 4) a resolution of one part in 128 for one square wave period is available. When this design is employed with an integrating gyroscope, one least-significant-bit per square wave represents an increment of angle given by:

$$LSB = \frac{\theta_{max}}{2^n \times y} \text{ deg/sec}$$

where $\theta_{max}$ is the full scale rate in degrees per second; n is the number of bits available in the counter; and y is the square wave frequency. Thus, a resolution of one part in 128,000 is provided for 1,000 square wave periods.

Figure 5:
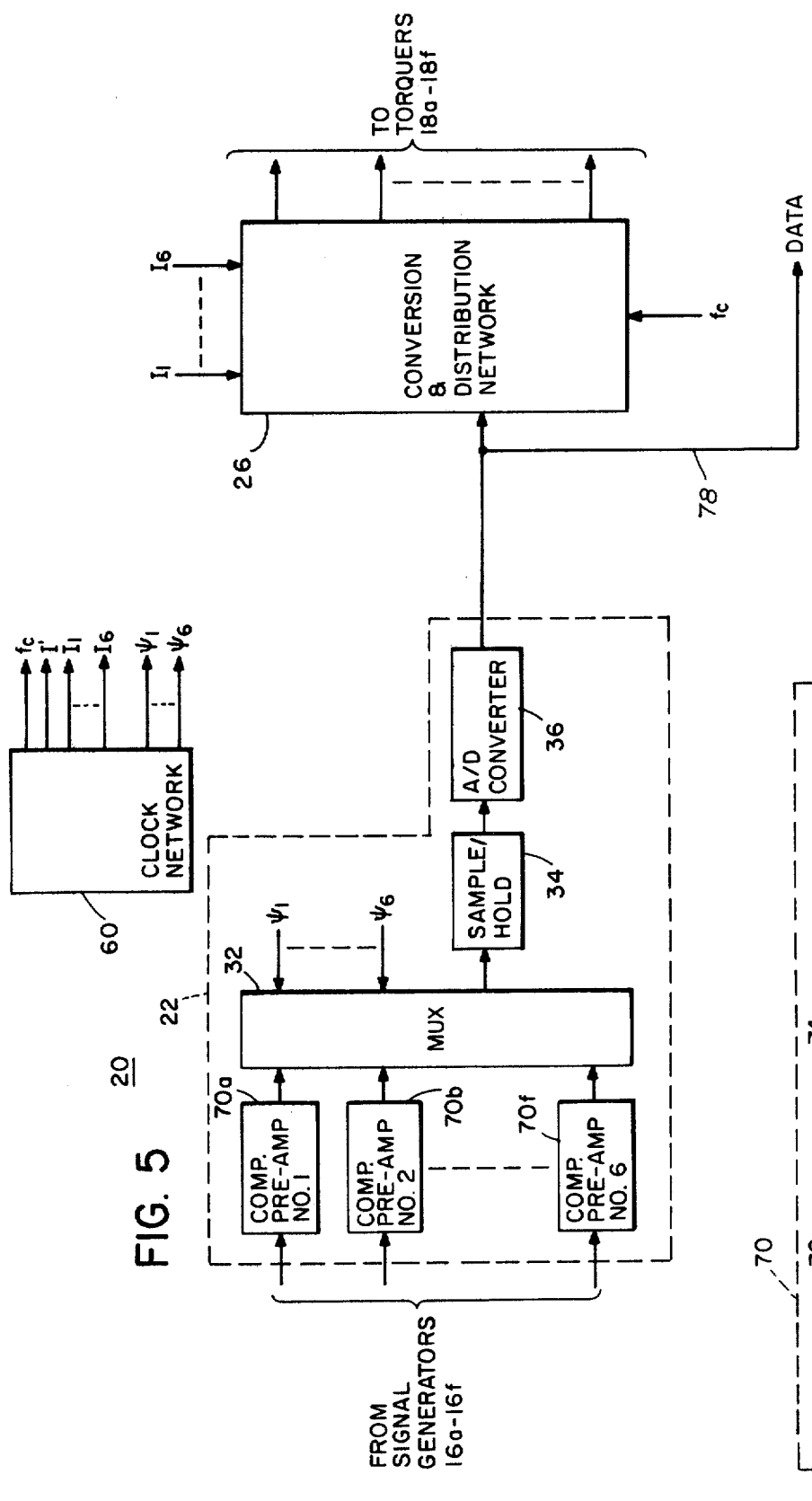
FIG. 5 shows, in block diagram form a second exemplary embodiment of multiplex rebalance network according to the present invention.
Figure 6:
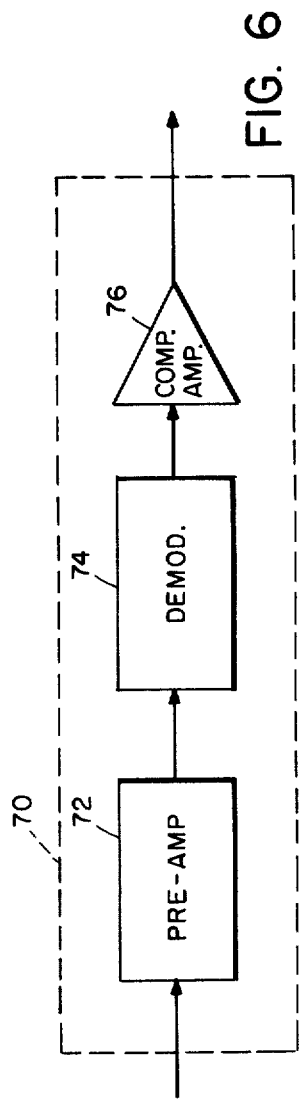
FIG. 6 shows, in block diagram form, an exemplary embodiment of the compensation preamplifier of FIG. 5.

Referring now to FIG. 5, in an alternate embodiment of the invention the computing network 24 is eliminated and the compensation provided by the computing network 24 is added to the preamplifiers 30a, 30b, ... 30f, of FIG. 2 to provide, in their place, compensation preamplifiers 70a, 70b, ... 70f (FIGS. 5 and 6). Thus, each compensation preamplifier 70 incorporates a preamplifier such as amplifiers 30, a demodulator 74 and a compensation amplifier 76 which is tuned and adjusted to the particular inertial sensor with which it is associated. In this second illustrated embodiment, therefore, the input signals to multiplexer 32 are already "compensated" and the output of the A/D converter 36 is a digitized representation of the compensated analog signal output of compensation amplifiers 70. The A/D output signal, in digital form, is made available over data lines 78 for use by an external computing apparatus so that the total torque applied to torquers 18 can be monitored, measured, and processed. (Similar information is available on the DATA line of the first embodiment of the invention shown in FIG. 2).

The digital output of the A/D converter is, as shown, also provided directly to the conversion and distribution network 26. This network operates as shown in FIGS. 1-4 with the exception that the $I_1$-$I_6$ signals are connected to correspond to the system of FIG. 5.

Clearly, the invention may be embodied in other specific forms without departing from the spirit or essential characteristics thereof. Thus, for example, the digitally quantized, pulse width modulated rebalance loop can be employed in inertial instruments which do not have the multiplexing feature. The present embodiments are therefore to be considered as illustrative and not restrictive, the scope of the invention being defined by the appended claims.

APPENDIX

| Memory Location | Instructions | Mneumonic |
|---|---|---|
| A000 | 00 | |
| A001 | 84 | |
| 0040 | 00 | |
| 41 | | MANUAL |
| 0060 | | INITIALIZATION |
| thru | 00 | |
| 077 | | |
| 001C | 0F | SEI |
| 001D | 8E | LDS |
| 1E | 00 | |
| 1F | FF | |
| 0020 | 86 | LDAA #$00 |

APPENDIX-continued

| Memory Location | Instructions | Mneumonic |
|---|---|---|
| 21 | 00 | |
| 22 | B7 | STAA PIAIAD |
| 23 | 80 | |
| 24 | 04 | |
| 25 | 86 | LDAA #$3F |
| 26 | 1F | |
| 27 | B7 | STAA PIAIAC |
| 28 | 80 | |
| 29 | 05 | |
| 002A | 86 | LDAA #$FF |
| 2B | FF | |
| 2C | B7 | STAA PIABD |
| 2D | 80 | |
| 2E | 06 | |
| 2F | 86 | LDAA #$3C |
| 0030 | 36 | |
| 31 | B7 | STAA PIAIBC |
| 32 | 80 | |
| 33 | 07 | |
| 34 | 0E | CLI |
| 35 | 3E | WAI |
| 36 | 20 | BRA |
| 37 | FD | |
| 0084 | DE | LDX |
| 85 | 40 | |
| 86 | B6 | LDAA |
| 87 | 80 | |
| 88 | 2B | BMI |
| 008A | 08 | |
| 8B | 8C | CPX |
| 8C | 00 | |
| 8D | 00 | |
| 8E | 26 | BNE |
| 8F | 06 | |
| 90 | DF | STX |
| 91 | 40 | |
| 92 | 3B | RTI |
| 93 | CE | LDX |
| 94 | 00 | |
| 95 | 60 | |
| 96 | F6 | LDAB |
| 97 | 80 | |
| 98 | 04 | |
| 99 | 37 | ISHB |
| 009A | 57 | ASRB |
| 9B | 57 | ASRB |
| 9C | 57 | ASRB |
| 9D | A6 | LDAA |
| 9E | 00 | |
| 9F | 1B | ABA |
| A0 | 29 | BVS |
| A1 | 07 | |
| A2 | A7 | STAA |
| A3 | 00 | |
| A4 | 33 | PULB |
| A5 | 1B | ABA |
| A6 | 28 | BVC |
| A7 | 04 | |
| A8 | 34 | DES |
| A9 | 33 | PULB |
| 00AA | 20 | BRA |
| AB | 01 | |
| AC | 16 | TAB |
| AD | 58 | ASLB |
| AE | 25 | BCS |
| AF | 07 | |
| 00B0 | 86 | LDAA |
| B1 | 7F | |
| B2 | 10 | SBA |
| B3 | 2B | BMI |
| B4 | 09 | |
| B5 | 20 | BRA |
| B6 | 0D | |
| B7 | 86 | LDAA |
| B8 | 80 | |
| B9 | 1B | ABA |
| BA | 2B | BMI |
| BB | 06 | |
| BC | 20 | BRA |
| BD | 06 | |

APPENDIX-continued

| Memory Location | Instructions | Mneumonic |
|---|---|---|
| BE | C6 | LDAB |
| BF | 7E | |
| 00C0 | 20 | BRA |
| C1 | 02 | |
| C2 | 06 | LDAB |
| C3 | 80 | |
| C4 | F7 | STAB |
| C5 | 80 | |
| C6 | 06 | |
| C7 | 0C | CLC |
| C8 | EB | ADD |
| C9 | 0C | |
| CA | E7 | STA |
| CB | 0C | |
| CC | 08 | INX |
| CD | C6 | LDAB 00 |
| CE | 00 | |
| CF | E9 | ADC INDEXED |
| 00D0 | 0C | |
| D1 | E7 | STA |
| D2 | 0C | |
| D3 | 08 | |
| D4 | DF | STX |
| D5 | 40 | |
| D6 | 3B | RTI |

I claim:

1. In a digital rebalance loop inertial instrument having an inertial sensor for each of at least one rebalance loop, each sensor having an associated means for generating a position signal and having an associated torquer means for applying a torque to said sensor in response to an applied torquer signal,
   a rebalance network coupled to each said inertial sensor, said network comprising
      digital torque correction means for generating a digital correction signal for each sensor comprising a succession of digital correction words, wherein each digital correction word in said succession is representative of the value of a torque signal to be applied to one of said sensor torquer means,
      digital pulse width modulation means responsive to said succession of digital correction words for generating a corresponding succession of pulse width modulated, constant amplitude, digitally controlled, discretely timed torquer signals, and
      means for applying said torquer signals to each said respective sensor torquer means.

2. The digital rebalance loop inertial instrument of claim 1 wherein said digital torque correction means comprises
   means responsive to the output of a position signal generation means for providing an analog output signal corresponding to the torque to be applied to the torquer associated with the sensor for correcting the position of the sensor, and
   an analog to digital circuit means for converting said analog torquer signal to said succession of digital correction words.

3. The digital rebalance loop inertial instrument of claim 1 wherein said pulse width modulation means comprises
   a counter element,
   a set/reset flip-flop responsive to a signal from said counter,
   a current supply circuit responsive to the state of said flip-flop, said current supply circuit providing current as a torquer signal in one direction when the flip-flop is in a first state and in an opposite direction when the flip-flop is in a second state,
   said counter being responsive to said digital torque correction means for storing a digital count word at the beginning of a counting cycle,
   said counter being responsive to a repetitive clock signal for incrementing its count each clock cycle, and
   timing means for enabling said counter to store the output of said digital torque correction means and initiate said counting cycle.

4. In a digital rebalance loop inertial instrument having an inertial sensor for each of at least one rebalance loop, each sensor having an associated means for generating a position signal and having an associated torquer means for applying a torque to said sensor in response to an applied torquer signal,
   a rebalance network coupled to each said inertial sensor, said network comprising
      means responsive to the output of a position signal generation means for providing an analog output signal corresponding to the torque to be applied to the torquer associated with the sensor for correcting the position of the sensor,
      an analog to digital circuit means for converting said analog torquer signal to a succession of digital correction words, therein each digital correction word in said succession is representative of the value of a torque signal to be applied to one of said sensor torquer means,
      digital pulse width modulation means responsive to said succession of digital correction words for generating a corresponding succession of pulse width modulated, constant amplitude, digitally controlled, discretely timed torquer signals, said pulse width modulation means comprising
         a counter element,
         a two state element responsive to a signal from said counter,
         a current supply circuit responsive to the state of said two state element, said current supply circuit providing current in one direction when the element is in a first state and in an opposite direction when the element is in a second state,
         said counter being responsive to said analog to digital circuit for storing a digital count word at the beginning of a counting cycle,
         said counter being responsive to a repetitive clock signal for incrementing its count each clock cycle, and
         timing means for enabling said counter to store the output of said analog to digital circuit and initiate said counting cycle, and
      means responsive to said current supply circuit for applying said torquer signals to each said respective sensor torquer.

5. In a digital rebalance loop inertial instrument having an inertial sensor for each of at least one rebalance loop, each sensor having an associated means for generating a position signal and having an associated torquer means for applying a torque to said sensor in response to an applied torquer signal,
   a rebalance network coupled to each said inertial sensor, said network comprising
      a torque correction means having a sampling means for successively sampling said position signals and for generating a digital position signal comprising a succession of digital position words, wherein each digital position word in said succession is representative of a value of one of said position signals at the corresponding sample time, and a computing means responsive to said succession of digital position signals for generating a corresponding succession of digital correction words, wherein each digital correction word in said succession is representative of the value of a torque signal to be applied to one of said sensor torquer means, digital pulse width modulation means responsive to said succession of digital correction words for generating a corresponding succession of pulse width modulated, constant amplitude, digitally controlled, discretely timed torquer signals, said pulse width modulation means comprising a counter element, a two state element responsive to a signal from said counter, a current supply circuit responsive to the state of said element, said current supply circuit providing current in one direction when the element is in a first state and in an opposite direction when the element is in a second state, said counter being responsive to said computing means for storing a digital count word at the beginning of a counting cycle, said counter being responsive to a repetitive clock signal for incrementing its count each clock cycle, and timing means for enabling said counter to store the output of said computing means and initiate said counting cycle, and means responsive to said current supply circuit for applying said torquer signals to each said respective sensor torquer means.

* * * * *